United States Patent
Walter et al.

(10) Patent No.: US 9,144,198 B2
(45) Date of Patent: Sep. 29, 2015

(54) HARVESTING MACHINE WITH A LIGHTENING DEVICE

(75) Inventors: Rene Walter, Goetzenbruck (FR);
Martin Walch, Dettwiller (FR);
Bernard Wattron, Haegen (FR)

(73) Assignee: KUHN S.A., Saverne (FR)

( * ) Notice: Subject to any disclaimer, the term of this patent is extended or adjusted under 35 U.S.C. 154(b) by 229 days.

(21) Appl. No.: 13/880,631

(22) PCT Filed: Oct. 17, 2011

(86) PCT No.: PCT/FR2011/052418
§ 371 (c)(1),
(2), (4) Date: Apr. 19, 2013

(87) PCT Pub. No.: WO2012/052669
PCT Pub. Date: Apr. 26, 2012

(65) Prior Publication Data
US 2013/0205738 A1   Aug. 15, 2013

(30) Foreign Application Priority Data
Oct. 21, 2010   (FR) ..................................... 10 58605

(51) Int. Cl.
*A01D 34/00* (2006.01)
*A01D 67/00* (2006.01)
*A01B 63/14* (2006.01)
*A01D 34/64* (2006.01)

(52) U.S. Cl.
CPC .............. *A01D 67/00* (2013.01); *A01B 63/145* (2013.01); *A01D 34/00* (2013.01); *A01D 34/64* (2013.01)

(58) Field of Classification Search
CPC ...... B06G 11/18; B06G 17/0277; B06G 3/14; B06G 15/061; A01B 63/00; A01B 63/22
USPC ............ 60/413, 469; 172/669, 239, 507, 395, 172/413; 56/229, 14.7, 15.2, 15.7
See application file for complete search history.

(56) References Cited

U.S. PATENT DOCUMENTS

| | | | | |
|---|---|---|---|---|
| 3,761,110 | A * | 9/1973 | Grosseau | 280/124.159 |
| 3,869,861 | A * | 3/1975 | Case | 60/413 |
| 4,590,751 | A * | 5/1986 | Stephenson | 56/192 |
| 4,923,014 | A | 5/1990 | Mijnders | |
| 5,060,462 | A * | 10/1991 | Helfer et al. | 56/14.9 |
| 5,107,663 | A * | 4/1992 | Wattron et al. | 56/15.7 |

(Continued)

FOREIGN PATENT DOCUMENTS

| EP | 0 149 870 | 7/1985 |
|---|---|---|
| EP | 0 741 960 | 11/1996 |

(Continued)

OTHER PUBLICATIONS

International Search Report Issued Dec. 27, 2011 in PCT/FR11/52418 Filed Oct. 17, 2011.

*Primary Examiner* — Arpád Fábián-Kovács
(74) *Attorney, Agent, or Firm* — Oblon, McClelland, Maier & Neustadt, L.L.P.

(57) ABSTRACT

A harvesting machine includes a frame carrying at least one harvesting mechanism and a lightening device of the harvesting mechanism. The lightening device includes second hydraulic jacks articulated on the frame and on the harvesting mechanism and connected by hydraulic circuits to first hydraulic jacks so as to be able to be actuated by the first hydraulic jacks and to hydropneumatic accumulators.

6 Claims, 5 Drawing Sheets

(56) References Cited

U.S. PATENT DOCUMENTS

| | | | |
|---|---|---|---|
| 5,136,828 A * | 8/1992 | Ermacora | 56/10.2 R |
| 5,794,424 A | 8/1998 | Ermacora et al. | |
| 6,055,800 A * | 5/2000 | Walch | 56/16.7 |
| 6,145,859 A * | 11/2000 | Altherr et al. | 280/124.159 |
| 6,269,619 B1 | 8/2001 | Walch et al. | |
| 6,616,167 B2 * | 9/2003 | Guiet | 280/414.5 |
| 6,745,849 B2 * | 6/2004 | Guiet | 172/669 |
| 6,845,603 B1 * | 1/2005 | Stephenson et al. | 56/218 |
| 6,912,832 B1 * | 7/2005 | Thompson et al. | 56/14.7 |
| 7,207,166 B2 * | 4/2007 | Stephenson | 56/15.2 |
| 8,020,364 B2 * | 9/2011 | Walch | 56/320.1 |
| 8,037,666 B2 * | 10/2011 | Walch et al. | 56/15.8 |
| 2006/0150604 A1 * | 7/2006 | Kieffer et al. | 56/15.8 |
| 2008/0238004 A1 * | 10/2008 | Turco et al. | 280/5.503 |
| 2011/0047947 A1 | 3/2011 | Walch et al. | |

FOREIGN PATENT DOCUMENTS

| | | |
|---|---|---|
| FR | 2 786 977 | 6/2000 |
| FR | 2 851 414 | 8/2003 |
| FR | 2 930 864 | 11/2009 |

* cited by examiner

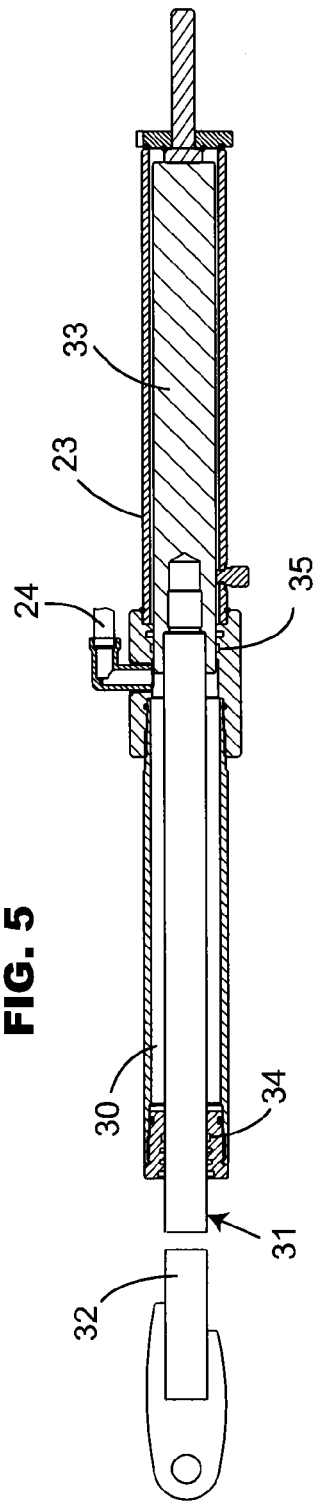
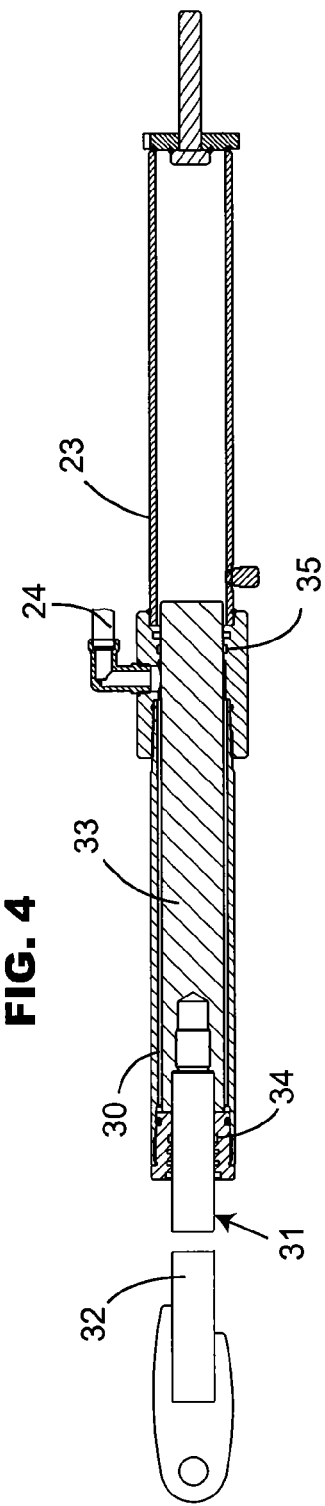

HARVESTING MACHINE WITH A LIGHTENING DEVICE

BACKGROUND OF THE INVENTION

1. Field of the Invention

The present invention relates to a harvesting machine comprising:
- a carrier frame comprising lateral uprights on which are articulated pivots equipped with wheels,
- first hydraulic jacks which are connected to the lateral uprights and to the pivots,
- at least one harvesting mechanism which is provided with cutting members,
- a suspension device linking the harvesting mechanism to the frame and allowing a vertical displacement of the harvesting mechanism with respect to the frame and
- a lightening device of the harvesting mechanism.

2. Description of the Related Art

In the known harvesting machines of this type, the lightening device is generally constituted by draw-springs arranged between the frame and the suspension device. These springs then exert an upward traction on the suspension device and the harvesting mechanism and thus transfer a part of their weight on the frame. This lightening prevents the harvesting mechanism from resting too heavily on the ground. It can thus easily follow the differences in level of the ground. This reduces the risk of mishandling the plant cover which could result from too strong a pressure of the said mechanism on the ground. The power to be developed for moving the machine during work can also be reduced. Finally, the wear of the parts of the harvesting mechanism which rub on the ground is less rapid.

The draw-springs currently used on harvesting machines are bulky and cumbersome, particularly when the machine has a large working width. On these machines, there is also a risk of cut products jamming between the turns of these springs, which could harm their functioning. Finally, their cost is relatively high.

BRIEF SUMMARY OF THE INVENTION

The present invention has the aim of proposing a different lightening device, not having the above-mentioned drawbacks.

To this end, an important feature of the invention consists in that the lightening device is constituted by second hydraulic jacks which are articulated on the frame and on the harvesting mechanism or its suspension device and which are connected by hydraulic circuits, on one hand, to the first hydraulic jacks so as to be able to be actuated with these latter and, on another hand, to hydropneumatic accumulators.

In the work position of the machine, the second hydraulic jacks keep the harvesting mechanism in a position in which it is situated substantially at the level of the ground. The weight of the harvesting mechanism is then essentially transferred to the frame, which makes it possible to move easily on the surface of the ground. In addition, it can easily follow the differences in level owing to the hydropneumatic accumulators which absorb and restore a certain volume of oil of the hydraulic circuit, which allows the second hydraulic jacks to shorten or to extend according to the requirements. These movements are, in addition, damped by the said accumulators.

The second hydraulic jacks also ensure a supplementary raising of the harvesting mechanism with respect to the ground when it is brought into the transport position. In fact, the hydraulic connection between the second hydraulic jacks and the first hydraulic jacks causes these latter to actuate the second hydraulic jacks when they are themselves actuated to lift the frame with respect to the wheels. The combination of the lifting movements of these second and first hydraulic jacks increases in a simple manner the distance of the harvesting mechanism from the ground. This makes its passage over possible obstacles which could be situated on the ground easier.

Finally, it is possible to adjust the lightening of the harvesting mechanism to a given value, without the lightening which has thus been determined being modified by the raising or lowering operations of the frame. Other features and advantages of the invention will emerge from the following description with reference to the attached drawings which represent, by way of non-restrictive example, an embodiment of the mower according to the invention.

BRIEF DESCRIPTION OF THE SEVERAL VIEWS OF THE DRAWINGS

In these drawings:

FIGS. 4 and 5 represent, on a larger scale, sections of a second hydraulic jack according to the invention, respectively in extended position during work and in shortened position during transport.

DETAILED DESCRIPTION OF THE INVENTION

Figure 1:
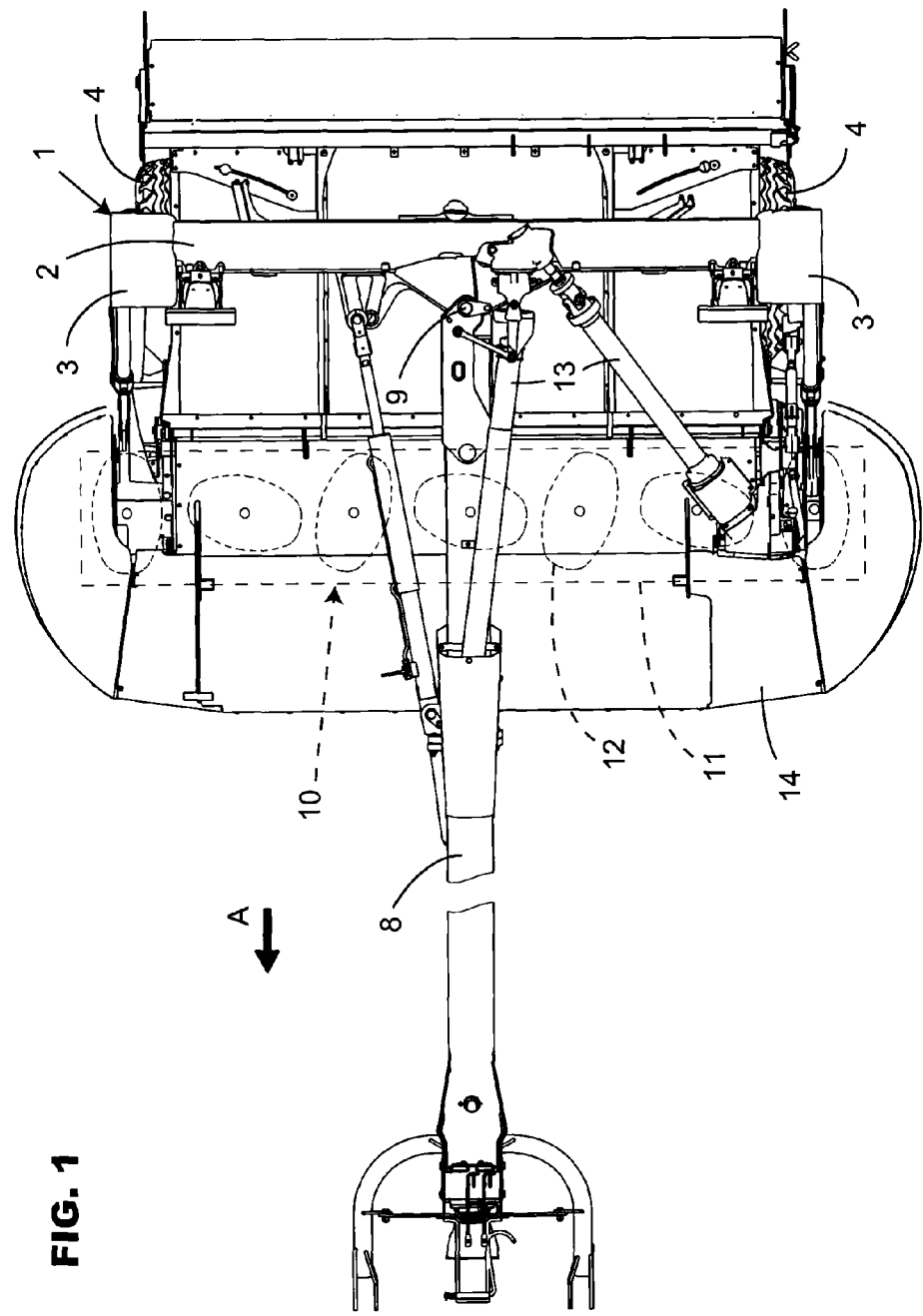
FIG. 1 represents a top view of a machine according to the invention.
Figure 2:
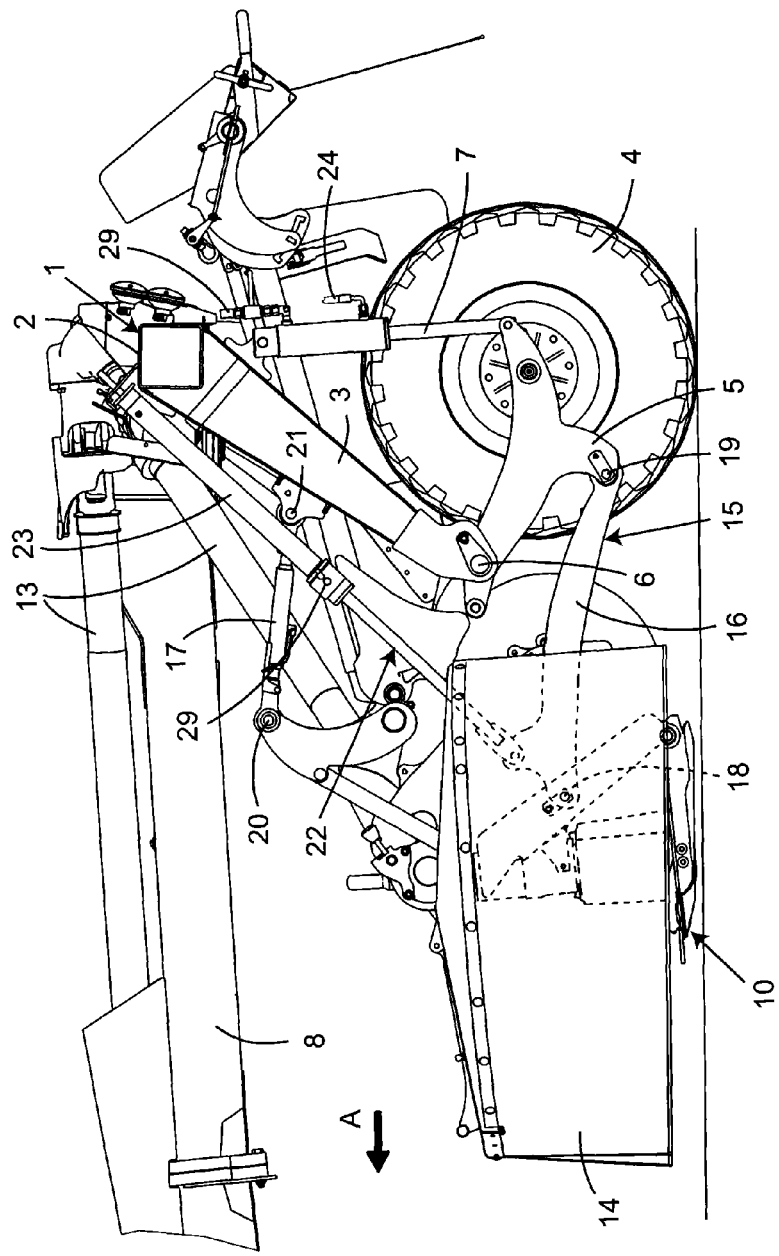
FIG. 2 represents a side view, partially in section, of the machine in work position.
Figure 3:
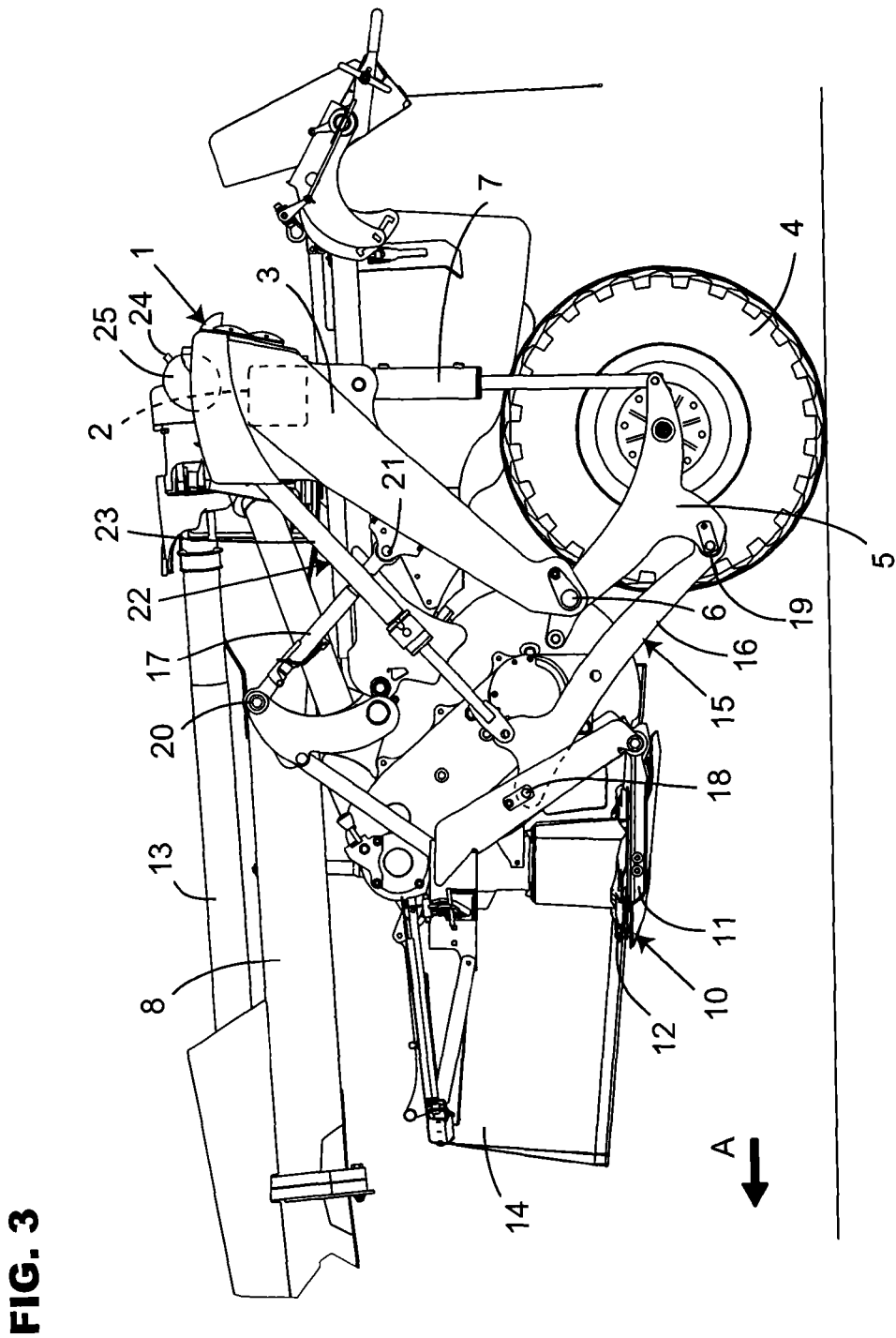
FIG. 3 represents a side view, partially in section, of the machine in transport position.

As it is represented in FIGS. 1 to 3, the harvesting machine according to the invention is a mower with a frame (1) having in particular a transverse carrier beam (2) and two lateral uprights (3) to which wheels (4) are connected. Each of these wheels (4) is mounted on a pivot (5) which is articulated by means of an axis (6) on the corresponding lateral upright (3). Between each pivot (5) and the corresponding lateral upright (3) of the frame (1) a first hydraulic jack (7) is arranged, making is possible to move the frame (1) vertically with respect to the wheels (4). A connecting means (8) such as a bar is articulated on a substantially vertical axis (9) of the frame (1). This connecting means (8) makes it possible to couple the mower to a tractor vehicle (not represented) which ensures both the displacement in a direction of advance (A) and the powering of the various members of the mower.

The frame (1) carries a harvesting mechanism (10). This is constituted by a casing (11) supporting cutting members (12), in particular of plants. These cutting members (12) are constituted by discs provided with blades which are driven in rotation by means of transmission members (13) going from the tractor up into the casing (11). The cutting members (12) are advantageously surrounded by a safety guard (14). The harvesting mechanism (10) can, in addition, comprise processing means of the mown products, such as conditioning rotors and/or windrowing devices. The harvesting mechanism (10) is connected to the frame (1) by means of a suspension device (15) allowing a vertical displacement of the harvesting mechanism (10) with respect to the frame (1). This suspension device (15) is composed of two lower connecting rods (16) and at least one upper connecting rod (17). The lower connecting rods (16) are situated on the lateral sides of the machine and are articulated on the harvesting mechanism (10) by means of axes (18) and on the pivots (5) of the frame (1) by means of axes (19). The upper connecting rod (17) is further remote from the ground than the lower connecting rods (16) and is articulated on the harvesting mechanism (10) with an axis (20) and on the frame (1) by means of an axis (21). These articulation axes (18, 19, 20 and 21) are all substantially horizontal and substantially perpendicular to the direction of advance (A).

The mower also comprises a lightening device (22) of the harvesting mechanism (10). It can be seen from FIGS. 2, 3 and 6 that this lightening device (22) is constituted by second hydraulic jacks (23) which are articulated on the frame (1) and on the harvesting mechanism (10) or on its suspension device (15) and which are connected by hydraulic circuits (24), on one hand, to the first hydraulic jacks (7) so as to be able to be actuated by these latter and, on another hand, to hydropneumatic accumulators (25) which are mounted on the frame (1).

The machine advantageously comprises two first hydraulic jacks (7) and two second hydraulic jacks (23). As can be seen from the partial section of FIG. 6, each of the first hydraulic jacks (7) includes a piston (26) dividing the interior of the corresponding jack into a first chamber (27) and a second chamber (28), each containing oil. Each first chamber (27) is connected by a hydraulic circuit (29) to a control device, which can be situated on the tractor and which can be actuated such that oil is injected in the hydraulic circuit (29) or else withdrawn therefrom. The control device therefore makes it possible to adjust the pressure which is prevailing in the hydraulic circuit (29). The hydraulic circuit (29) controls the raising and lowering of the frame (1) with respect to the ground. In fact, when oil is injected in each first chamber (27), the pressure in this latter increases up to a sufficiently high value so that the first hydraulic jack (7) extends and the frame (1) rises with respect to the ground. Each first hydraulic jack (7) is controlled in this way when the machine is to be placed into transport position or into windrow passage position, or else when it must pass over a particularly high obstacle. In this position, the frame (1) is at a maximum distance from the ground, the chamber (27) is filled with oil, whereas the chamber (28) is substantially emptied. When the control device is actuated so that oil returns from each first chamber (27) towards a reservoir connected to the hydraulic circuit (29), the pressure in each first chamber (27) reduces. Owing to the force of gravity exerting itself on the frame (1), the first hydraulic jack (7) shortens and the frame (1) moves closer to the ground. Each first hydraulic jack (7) is controlled in this way when the machine is placed into the work position. In the work position, the first hydraulic jack (7) has a substantially minimal extension corresponding to a substantially minimal or zero volume of the chamber (27). In the work position, the piston (26) therefore rests substantially in abutment against the cylinder of the first hydraulic jack (7). As can be seen from FIGS. 4 and 5, each second hydraulic jack (23) comprises a long body with a single chamber (30) which is closed by means of a piston (31) and intended to receive oil. The piston (31) is composed essentially of a rod (32) and a head (33), the diameter of which is less than that of the chamber (30). This piston (31) is guided in the body of the corresponding second hydraulic jack (23) at two sites or bearings (34 and 35) which remain fixed and which are provided with gaskets. The site (34) is used for the guidance of the rod (32), whilst the site (35) is used for the guidance of the head (33). These sites are relatively distant from one another so as to obtain a good guidance constantly. The head (33) of this piston (31) is substantially of the same length or has a greater length than that of the chamber (30) of the second hydraulic jack (23). Therefore, this head (33) does not penetrate totally in the chamber (30) and does not leave its guidance site (35) during its displacements. The head (33) is, in addition totally protected by the body of the corresponding jack.

Figure 6:
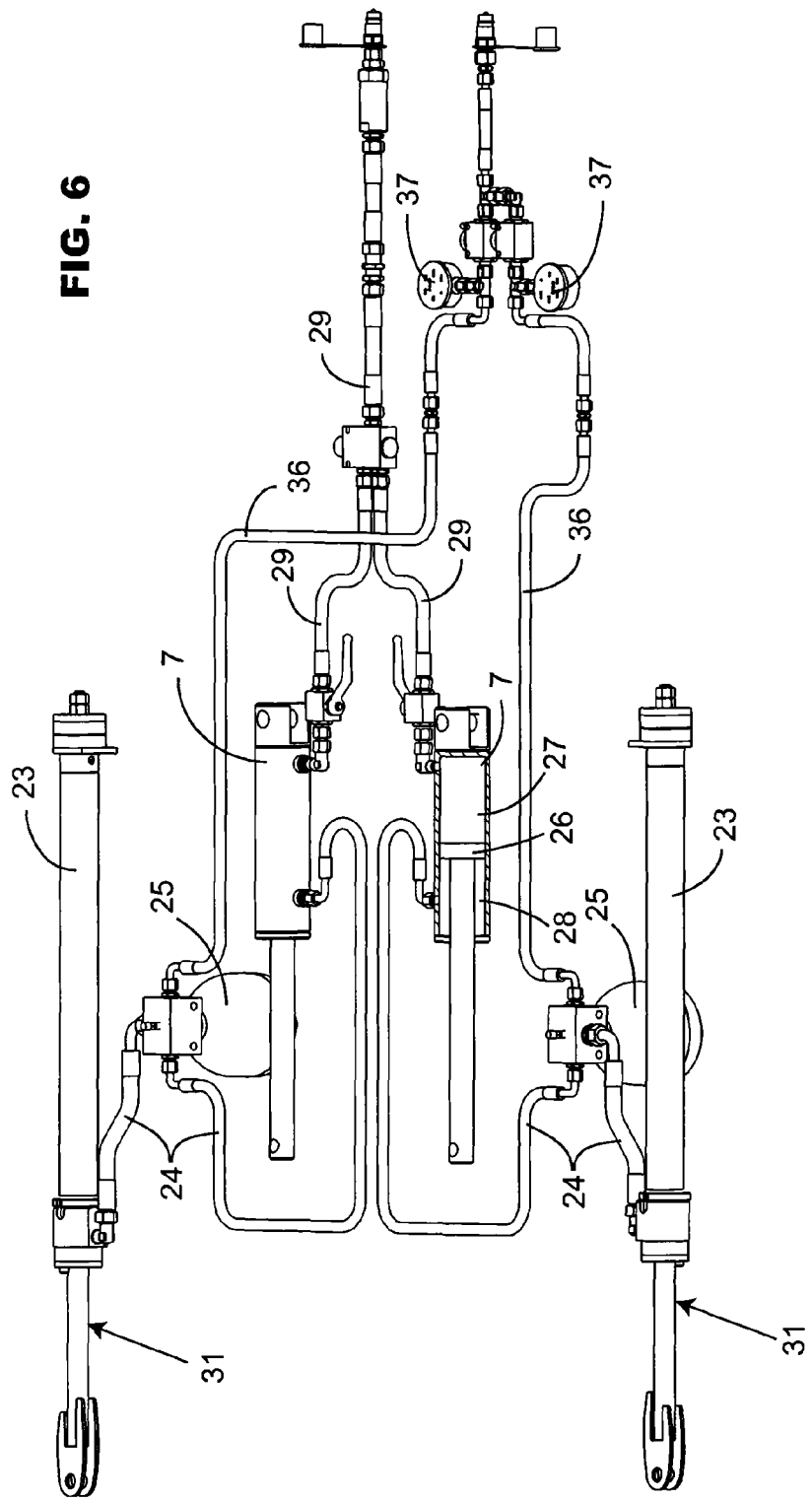
FIG. 6 represents a diagram of the hydraulics of the lightening device according to the invention.

It can also be seen from FIGS. 4 to 6 that the second chamber (28) of each first hydraulic jack (7) is connected by a hydraulic circuit (24) to the chamber (30) of a second hydraulic jack (23).

One of the hydropneumatic accumulators (25) is arranged on each hydraulic circuit (24) connecting the second chamber (28) of a first hydraulic jack (7) to the chamber (30) of a second hydraulic jack (23). These hydropneumatic accumulators (25), which are known per se, are advantageously fixed on the frame (1). The pressure of the oil in each of these hydraulic circuits (24) is adjustable preferably in an individual manner by means of a hydraulic circuit (36) which is connected to the hydraulic circuit (24). In addition, the hydraulic circuit (36) is connected to the control device. The control device can be actuated such that oil is injected in the hydraulic circuit (36) or else is withdrawn therefrom. The control device therefore makes it possible to adjust the pressure which is prevailing in the hydraulic circuit (36) and thus that which is prevailing in the hydraulic circuit (24). In addition, the pressure in the hydraulic circuit (36) can be controlled by means of a manometer (37) connected to the hydraulic circuit (36).

As can be clearly seen from FIG. 6, the hydraulic circuits (29) and (36) are preferably separated. Preferably, the control device makes it possible to control the hydraulic circuits (29) and (36) separately.

During work, an increase of the pressure of the oil in the hydraulic circuit (36) and hence in the corresponding hydraulic circuit (24) is without effect on the length of the first hydraulic jack (7) connected to the hydraulic circuit (24), since the chamber (27) of the first hydraulic jack (7) is substantially emptied. On another hand, this increase of the pressure of the oil generates an increase of the volume of the chamber (30) of the second hydraulic jack (23) connected to the hydraulic circuit (24). Thus, the second hydraulic jack (23) shortens, which increases the lightening of the harvesting mechanism (10). The lightening of the harvesting mechanism (10) can be adjusted precisely by the user owing to the manometers (37). Thus, on a mowing run, the user can adjust the pressure of the oil in the hydraulic circuits (24) until a satisfactory lightening is obtained. He then only has to note down the values displayed by the manometers (37). On a subsequent mowing run, the same lightening can be obtained again by adjusting the oil pressures so that the manometers (37) display the previously determined values.

The invention thus makes it possible to overcome a problem brought about by the draw-springs, namely the evolution in time of the value of the lightening due to the jamming of cut products between the turns of these springs. In addition, the invention enables a precise and reproducible adjustment of the lightening. During work, the harvesting mechanism (10) is lowered to the level of the ground. For this, each first hydraulic jack (7) is shortened, whilst each second hydraulic jack (23) is extended. To this end, the first chamber (27) of the first hydraulic jacks (7) is emptied, whilst the second chamber (28) fills with oil originating from the chamber (30) of the second hydraulic jack (23), by passing in the hydraulic circuit (24). In this position, the hydropneumatic accumulators (25) can absorb and restore a certain amount of oil of the hydraulic circuits (24), which allows variations in length of the second hydraulic jacks (23). Owing to this, all the weight of the harvesting mechanism does not rest on the ground and it can easily move vertically to follow the differences in level of the ground.

For the setting into transport position, oil is injected in the first chamber (27) of each first hydraulic jack (7). Simultaneously, oil is pushed back from their second chamber (28) towards the chamber (30) of each second hydraulic jack (23). During this operation, the first hydraulic jacks (7) move the pivots (5) with respect to the wheels (4) so that they raise the frame (1) and partially the harvesting mechanism (10). At the same time, the second hydraulic jacks (23) exert a traction on the harvesting mechanism (10) by means of the rods (32). The harvesting mechanism (10) then moves upwards with respect to the frame (1) owing to the suspension device (15). The harvesting mechanism (10) is thus brought into a transport position, in which it is considerably remote from the ground. In this position, the chamber (30) is filled with oil. For the setting into work position, the control operations are reversed.

Apart from the great raising amplitude of the harvesting mechanism with respect to the ground, obtained by the combination of the raising of the frame (1) with respect to the ground and the moving closer of the harvesting mechanism (10) with respect to the frame (1), the invention has another determining advantage. As mentioned above, the hydraulic circuit (29) enabling the raising of the frame (1), and the hydraulic circuit (36) enabling the adjustment of the lightening of the harvesting (10) are separate. It is thus possible to adjust the lightening of the harvesting mechanism to a given value, without the lightening, which is thus determined, being altered by the raising or lowering operations of the frame. In practice, the user can therefore, after having adjusted the lightening for a first plot which is to be mown, raise the machine into the transport position so as to move to an adjacent plot, then lower the machine into the work position and return to the lightening adjusted for the first plot. Likewise, the raising of the machine to pass above an obstacle present on the plot does not require an adjustment of the lightening once the machine is returned in work position. This results in an appreciable gaining of time.

As can further be seen from FIG. 6, the hydraulic circuit connecting the first hydraulic jacks (7) to the second hydraulic jacks (23) has a great simplicity, in particular comprising neither a valve nor a distributor, which are frequently used in the known machines of this type.

The invention is not limited to the embodiment described above and represented in the attached figures. It can also be applied to other agricultural machines having a harvesting mechanism, moving at the level of the ground, i.e. machines such as combine harvesters or silage cutters. Modifications are possible, in particular with regard to the constitution or the number of the various elements or by substitution of technical equivalents without, however, departing from the scope of protection.

The invention claimed is:

1. A harvesting machine comprising:
   a frame with a lateral upright;
   a pivot which is articulated on the lateral upright, the pivot including a wheel;
   a first hydraulic jack connected to the lateral upright and to the pivot, the first hydraulic jack including a first piston which divides an interior of the first hydraulic jack into a first chamber and a second chamber containing oil;
   a harvesting mechanism including cutting members;
   a suspension device linking the harvesting mechanism to the frame and allowing a vertical displacement of the harvesting mechanism with respect to the frame; and
   a lightening device of the harvesting mechanism,
   wherein the lightening device includes a second hydraulic jack articulated on the frame and on at least one of the harvesting mechanism or the suspension device,
   wherein the second hydraulic jack includes a second piston which closes a third chamber containing oil,
   wherein the third chamber of the second hydraulic jack is connected by a first hydraulic circuit to the second chamber of the first hydraulic jack such that the second hydraulic jack is able to be actuated by the first hydraulic jack,
   wherein a hydropneumatic accumulator is arranged on the first hydraulic circuit which connects the second chamber of the first hydraulic jack to the third chamber of the second hydraulic jack,
   wherein the first hydraulic circuit is connected to a second hydraulic circuit and the second hydraulic circuit is connected to a control device,
   wherein the first chamber of the first hydraulic jack is connected by a third hydraulic circuit to the control device,
   wherein the second and third hydraulic circuits are separate and can be controlled separately by the control device, and
   wherein, in a work position of the harvesting mechanism, the first chamber of the first hydraulic jack is substantially emptied of oil and the second chamber of the first hydraulic jack fills with oil originating from the third chamber of the second hydraulic jack, and, in a transport position of the harvesting mechanism, oil is injected into the first chamber of the first hydraulic jack and oil is pushed from the second chamber of the first hydraulic jack to the third chamber of the second hydraulic jack.

2. The machine as claimed in claim 1, wherein the second piston of the second hydraulic jack is guided in a body of the second hydraulic jack at two sites which remain fixed when the second piston moves.

3. The machine as claimed in claim 2, wherein the second piston of the second hydraulic jack comprises a head which has substantially a same length as the third chamber of the second hydraulic jack or a greater length.

4. The machine as claimed in claim 1, wherein pressure of the oil in the first hydraulic circuit connecting the second chamber of the first hydraulic jack to the third chamber of the second hydraulic jack is adjustable.

5. The machine as claimed in claim 2, wherein the second hydraulic jack comprises a head, having a diameter which is less than a diameter of the third chamber of the second hydraulic jack.

6. The machine as claimed in claim 1, wherein in the transport position, the first hydraulic jack moves the pivot with respect to the wheel such that the frame and the harvesting mechanism are raised.

* * * * *